Sept. 26, 1967 E. R. HACKBARTH 3,343,428

BRAKING MECHANISM

Filed Oct. 12, 1965

United States Patent Office

3,343,428
Patented Sept. 26, 1967

3,343,428
BRAKING MECHANISM
Eugene R. Hackbarth, Kenosha, Wis., assignor to J. I. Case Company, Racine, Wis., a corporation of Wisconsin
Filed Oct. 12, 1965, Ser. No. 495,051
7 Claims. (Cl. 74—478)

ABSTRACT OF THE DISCLOSURE

A selective braking mechanism for a vehicle having brake-actuating levers for left-hand or right-hand braking of the traction wheels and a master brake pedal for simultaneous braking of the wheels. The mechanism includes lever hub slots and a rockable member actuated by right or left-hand elements to condition the levers for braking the wheels. The rockable member is pivoted to move into and out of the slots upon engagement by one of the actuating or conditioning trigger elements.

---

This invention relates to a braking system and in particular to a braking mechanism for use on a tractor wherein each traction wheel has a brake unit and each wheel can be braked individuatlly or both wheels can be braked at the same time. Individual brake levers or pedals have been used in the past and the present invention is an improved braking device which may be installed on agricultural and industrial tractors, tractor trailers, earth moving equipment or on similar type vehicles. These vehicles utilize the individual wheel brake system or the simultaneous system for braking the traction wheels. The improved braking mechanism will be described as a part of an agricultural tractor, although it could be used on other vehicles, such as the types mentioned.

The principal object of the invention is to provide a mechanism for the purpose of actuating the wheel brakes individually or for actuating the brakes simultaneously.

Another object is to provide an improved braking device which includes a master brake pedal and a right-hand and a left-hand brake pedal.

Further objects and advantages will become apparent from the following specification and the annexed drawings, in which.

Figure 1:
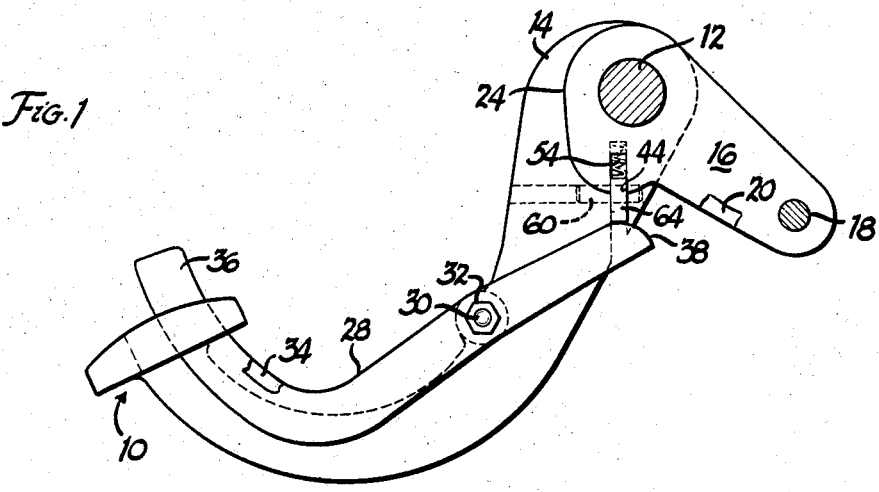
FIGURE 1 is a right-hand side view of the improved braking mechanism.
Figure 2:
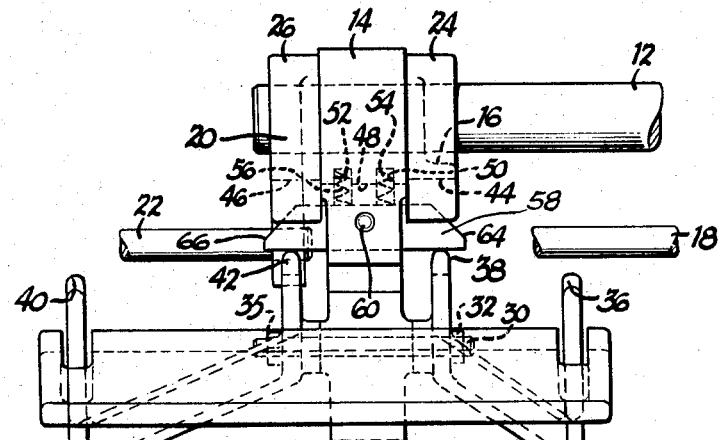
FIG. 2 is a rear view of the same looking forward and in the direction of travel.

As seen in FIGS. 1 and 2, a master brake pedal, generally designated as 10, is pivotally supported on a main shaft 12 which shaft is supported from the vehicle frame and extends to mechanism for opening and closing the brake shoe over the brake drum for each traction wheel of a tractor (not shown). The invention is described as being for a conventional agricultural tractor having a right-hand and a left-hand traction wheel, but it is to be understood that a plurality of right-hand and left-hand traction wheels may be controlled with the present device, modified as required for the particular application.

Pedal 10 has a hub portion 14 at one end thereof, which portion is connected to shaft 12 so that when pedal 10 is depressed, it imparts the motion through suitable mechanism to the brake shoes which close on the brake drums to slow or stop the traction wheels. The action of the shoe closing on the brake drum is conventional and need not be further described.

Shaft 12 is a pivotal support for pedal 10 and as the pedal is depressed, as mentioned above, it transmits the force necessary to brake the wheels. A right-hand lever or link 16 is connected to the shaft 12, so that as pedal 10 is depressed, link 16 rotates in an arc about shaft 12. Rods, shafts, or cables may be used to transmit the rotational force to the brake shoes, and in the present embodiment, a rod 18 is fixed to lever 16 for the right-hand brake. A left-hand lever or link 20 is connected to shaft 12, so that as pedal 10 is depressed, link 20 rotates in an arc about shaft 12, and a rod 22 is fixed to lever 20 for transmitting the force to the left-hand brake.

Right-hand lever 16 has a hub portion 24 supported on shaft 12 and left-hand lever 20 has a hub portion 26 supported on shaft 12. Hub portions 24 and 26 are constructed on shaft 12 to be adjacent hub portion 14 of pedal 10 for purposes to be described. The braking action is thus accomplished by depressing pedal 10 which rotates hub portion 14 and shaft 12, moves levers 16 and 20 and rods 18 and 22 in a path with shaft 12 as a center thereof. This action and the resulting force is transmitted by rods 18 and 22 to the traction wheel brakes for slowing or stopping the tractor.

As is both common and necessary in past and present day tractors, the right traction wheel must be sometimes slowed or stopped independently of the left-hand wheel, and vice versa. The present invention is made and constructed so that the right-hand traction wheel may be braked independently of the left-hand traction wheel, the left-hand wheel may be braked independently of the right-hand wheel, or both wheels may be braked at the same time.

The actuating means for initiating right-hand wheel braking consists of a trigger element or actuation member 28 which is pivotally supported from master pedal 10 as by a pin 30, secured by a nut 32. A similar actuating means for the left-hand brake consists of an element or member 34 pivotally supported from pedal 10 by pin 30 and secured by a nut 35. Element 28 has an extending portion 36 which is disposed in a direction so as to be above or in front of pedal 10 when the pedal is in its relaxed or unbraking position. Element 28 also has a tip portion 38 disposed in a direction toward hub portion 24 and remote from extending portion 36. When portion 36 is depressed, portion 38 is rotated about pin 30 and the pin serves as a fulcrum in a lever action for element 28. In similar manner of construction, element 34 has an extending portion 40 and a tip portion 42 so that when portion 40 is depressed, portion 42 is rotated about pin 30, the pin serving as a fulcrum in the lever action.

Hubs 24, 14, and 26, respectively, the right-hand hub, the master pedal hub and the left-hand hub, define slots 44, 48, and 46 on the underside of shaft 12. The right-hand hub slot 44 and the left hand hub slot 46 extend a greater distance into their respective hubs than does the pedal hub slot 48.

Hub 14 has defined therein a right-hand bore 50 and a left-hand bore 52, and resilient means positioned in the bores, a spring 54 in the right-hand bore and a spring 56 in the left-hand bore. A shiftable or rockable member 58 is pivotally supported in the slots by means of a pin 60, and member 58 is placed in a position so that it can be rotated a limited amount in slots 44 and 46. Hubs portions 24 and 26 are connected to shaft 12 adjacent hub portion 14, and member 58 is supported from pin 60, so that the upper portion of member 58 extends into slots 44, 46, and 48. When the member 58 is pivoted on pin 60 by reason of depressing the right-hand portion 36, the inclined portion 64 enters farther into slot 44 and the inclined portion 66 withdraws from slot 46, thus initiating right-hand braking action. Similarly, depressing left-hand portion 40 causes contact of tip 42 with the left-hand side of member 58 and pushes that side of the member farther into slot 46 and withdraws the right-hand side of member 58 from slot 44, thus initiating the left-hand braking action. The inclined portions of member 58 are constructed so that a more positive engagement is made in the slot when the member is pivoted on its supporting pin. The upper portion of member 58 has a right-hand inclined portion 64 and a left-hand inclined portion 66, these portions constructed so as to enter the appropriate guide slots for engagement with the respective hub as the rockable member 58 is turned on pivot pin 60. Member 58 is disclosed as a key or element which is free to move into and out of the slots due to depression of the actuating members.

It is thus seen from FIGS. 1 and 2 of the drawings and from the above description that herein disclosed is a brake mechanism which is an improved type for actuating the right-hand brake, the left-hand brake or for actuating both brakes at one time.

In the normal or "at rest" position of the braking mechanism, pedal 10 and members 28 and 34 are in the up position. Pedal 10 is held in this position by conventional means not necessary to describe. Members 28 and 34 are retained in the up position by the compression of springs 54 and 56 acting on the top surface or edge of rockable member 58. The springs retain or balance member 58 so that it remains substantially in a horizontal position while engaging with hubs 24, 14, and 26 in their respective slots.

When the operator wishes to slow or stop the tractor, he depresses the master brake pedal on the section between extending portions 36 and 40 of elements 28 and 34. Shaft 12 acts as the fulcrum in the lever action in the rotation of shaft 12, hubs 24, 14, and 26 and levers 16 and 20. Depressing the master pedal rotates shaft 12, hubs 24, 14, and 26, levers 16 and 20, as stated, and revolves shafts 18 and 22 in a path around shaft 12, which imparts the force on the brake shoes to close on the brake drums to slow or stop the traction wheels.

When it is desired to slow or stop the right-hand traction wheel, the operator depresses the extending portion 36 of the right-hand actuation member 28. By reason of member 28 being pivoted on fulcrum pin 30, portion 38 engages with the right-hand side of rockable member 58 and turns member 58 in a counterclockwise direction, as viewed from the operator's seat and in the direction of travel. As the right side of member 58 is engaged and turned, the left-side of member 58 also turns in a counterclockwise direction. The right-side of member 58 is pushed farther into slot 44 and the left side of member 58 is withdrawn from slot 46. Extending portion 36 is depressed until the tip portion is at the plane of the pedal and further depression of the pedal rotates shaft 12, hubs 14 and 24, and lever 16 and, in turn, revolves rod 18 in a path around 12, which action is transmitted to the right-hand brake for braking the right-hand traction wheel. Since member 58 is not engaged in slot 46, in this position of actuating element 28, hub 26 and lever 20 and consequently, rod 22 are not actuated and only the right-hand wheel receives the braking force.

Release of pressure on pedal 10 and right-hand actuation member 28 restores the braking mechanism to the normal or rest position and springs 54 and 56 force rockable member 58 to a balanced or substantially horizontal position.

In similar manner, when it is desired to brake the left-hand wheel, the left-hand actuation member 34 is moved by depressing on extending portion 40, engaging tip 42 with the left-hand side of rockable member 58 and turning member 58 in a clockwise direction, thus pushing portion 42 farther into slot 46. The right-hand side of member 58 is thus withdrawn from slot 44. Depression of pedal 10 along with further depression of portion 40 rotates shaft 12, hubs 14 and 26, and lever 20 and rod 22 to apply braking force to the left-hand wheel. Again, release of pressure on pedal 10 and left-hand member 34 restores the mechanism to a normal or rest position and springs 54 and 56 return member 58 to its balanced position.

It is thus seen that herein described is an improved braking mechanism for controlling the forward or the reverse movement of the traction wheels and the tractor. Variations on the details of the braking mechanism will doubtless occur to those skilled in the art, and it is to be understood that all of these variations are considered to be within the scope of this application. The invention is not to be taken as limited by the embodiment described and illustrated, nor in fact in any manner except as defined in the annexed claims.

What is claimed as new and desired to be secured by Letters Patent of the United States is:

1. A braking mechanism for a vehicle having right and left hand traction wheel brakes; said mechanism including a pivotal support on said vehicle, a master pedal on said support and having a hub portion, a first brake lever and a second brake lever on said support, each of said levers having a hub portion, shiftable means on said master pedal positioned to engage with said first and second brake levers, actuating means pivotally connected to said master pedal, and means connected with said actuating means and engagable with said shiftable means positioned to shift said shiftable means by reason of actuation of said actuating means in the direction to disengage said shiftable means from one of said brake levers whereby depression of said master pedal rotates its hub portion and the hub portion of the other of said brake levers for braking one of said traction wheels.

2. A braking mechanism for a vehicle having right and left-hand traction wheel brakes; said mechanism including a pivotal support on said vehicle, a master pedal on said support and having a hub portion, a first brake lever and a second brake lever on said support, each of said levers having a hub portion adjacent said master pedal hub portion, shiftable means on said master pedal positioned to engage with said first and second brake levers, actuating means pivotally connected to said master pedal and extending generally in the direction of said pedal, and means connected with said actuating means and engagable with said shiftable means positioned to shift said shiftable means by reason of actuation of said actuating means in the direction to disengage said shiftable means from one of said brake levers whereby depression of said master pedal rotates its hub portion and the hub portion of the other of said brake levers for braking one of said traction wheels.

3. An improved braking mechanism for a tractor having right-hand and left-hand traction wheel brakes and a master pedal for actuating said brakes; the improvement including a pivotal member on said tractor, said master pedal being supported at one end therefrom, a right-hand brake lever and a left-hand brake lever, each of said brake levers being connected to said pivotal member adjacent said master pedal, rockable means on said master pedal positioned to engage with said right-hand and left-hand brake levers, a right-hand trigger element and a left-hand trigger element pivotally connected to said master pedal, each of said trigger elements having a portion connected to said trigger element and engaged with said rockable means by reason of actuation of said trigger element in the direction to disengage said rockable means from the other one of said brake levers whereby depression of one of said trigger elements causes said rockable means to rock thereby engaging one of said brake levers with said master brake for rotating said master brake and braking one of said traction wheels upon actuation of the master brake pedal.

4. An improved braking mechanism for a tractor having right-hand and left-hand traction wheel brakes and a master pedal for actuating said brakes; the improvement including a pivotal member on said tractor, said master pedal being supported at one end therefrom, a right-hand brake lever and a left-hand brake lever, each of said brake levers being connected to said pivotal member adjacent said master pedal, rockable means on said master pedal positioned to engage with said right-hand and left-hand brake levers, means in said master pedal tending to prevent said rockable means from rocking, a right-hand trigger element and a left-hand trigger element pivotally connected to and disposed generally in the direction of said master pedal, each of said trigger elements having a portion connected to said trigger element and engaged with said rockable means by reason of actuation of said trigger element in the direction to disengage said rockable means from one of said brake levers whereby depression of one of said trigger elements causes said rockable means to rock thereby engaging the other one of said brake levers with said master brake for rotating said master brake and braking the other one of said traction wheels upon actuation of the master brake pedal.

5. In a braking system for a tractor of the type having right-hand and left-hand traction wheel brakes and a master brake pedal, means for actuating said brakes individually; said means including a main shaft supported from said tractor, said master brake pedal being pivotally connected to said main shaft, a right-hand brake lever and a left-hand brake lever, each lever being pivotally supported from said main shaft adjacent said master brake pedal, a rockable key on said master brake pedal positioned to engage with said right-hand and left-hand brake levers, a right-hand actuation member and a left-hand actuation member, each member being pivotally supported from said master brake pedal, guide means in said right-hand and left-hand brake levers and in said master brake pedal, said guide means being adjacent said main shaft, and resilient means in said master brake pedal tending to prevent said key from rocking, said right-hand and left-hand actuation members being positioned to engage with said rockable key whereby, in one position of said actuation members, depression of one of said actuation members causes said key to rock further into one of said guide means thereby engaging only one of said brake levers with said master brake pedal for rotating said brake lever and braking one of said traction wheels upon actuation of the master brake pedal.

6. In a braking system for a tractor of the type having right-hand and left-hand traction wheel brakes and a master brake pedal, means for actuating said brakes individually; said means including a main shaft supported from said tractor, said master brake pedal being pivotally connected to said main shaft, a right-hand brake lever and a left-hand brake lever, each lever being pivotally supported from said main shaft adjacent said master brake pedal, a rockable key on said master brake pedal positioned to engage with said right-hand and left-hand brake levers, a right-hand actuation member and a left-hand actuation member, each being pivotally supported from said master brake pedal, guide means in said right-hand and left-hand brake levers and in said master brake pedal, said guide means being adjacent said main shaft, and resilient means in said master brake pedal tending to prevent said key from rocking, said right-hand and left-hand actuation members being positioned to engage with said rockable key whereby, in one position of said actuation members, depression of one of said actuation members causes said key to rock further into one of said guide means and thereby engaging only one of said brake levers with said master brake pedal for rotating said brake lever and braking one of said traction wheels upon actuation of the master brake pedal, and, in another position of said actuation members, depression of said master brake pedal rotates said brake levers and brakes said traction wheels.

7. A braking mechanism for a tractor having right and left-hand traction wheel brakes; said mechanism including a pivotal support on said tractor, a master pedal on said support, said pedal having a hub portion, a first brake lever and a second brake lever on said support, each of said levers having a hub portion, a key element on said master pedal positioned to engage with said first and second brake levers, triggering means pivotally connected to said master pedal, and means connected to said triggering means and engagable with said key element positioned to shift said key element by reason of actuation of said triggering means in a direction to disengage said key element from one of said brake levers whereby depression of said master pedal rotates its hub portion and the hub portion of the other of said brake levers for braking one of said traction wheels.

References Cited
UNITED STATES PATENTS

| | | | |
|---|---|---|---|
| 806,708 | 12/1905 | Perry | 74—539 |
| 1,254,982 | 1/1918 | Caudron | 74—539 |
| 2,463,515 | 3/1949 | Buffardi | 192—131 |
| 3,246,728 | 4/1966 | Hicks et al. | 192—131 |

FOREIGN PATENTS

| | | |
|---|---|---|
| 436,652 | 10/1935 | Great Britain. |

FRED C. MATTERN, JR., *Primary Examiner.*

C. F. GREEN, *Assistant Examiner.*